United States Patent [19]
Ortolano et al.

[11] Patent Number: 5,026,032
[45] Date of Patent: Jun. 25, 1991

[54] BLADE ASSEMBLY TOOL

[75] Inventors: Ralph J. Ortolano, Rancho Palos Verdes; Kenneth A. Ball, Huntington Beach; Gary Bowman, Riverside, all of Calif.

[73] Assignee: Southern California Edison, Rosemead, Calif.

[21] Appl. No.: 483,129

[22] Filed: Feb. 22, 1990

[51] Int. Cl.$^5$ .............................................. B23P 19/04
[52] U.S. Cl. ...................................... 269/43; 29/281.5
[58] Field of Search ........................ 269/37, 40, 43, 45, 269/47, 249, 71; 29/281.5, 449

[56] References Cited

U.S. PATENT DOCUMENTS

| | | | |
|---|---|---|---|
| 2,429,109 | 10/1947 | Rooch | 269/47 |
| 2,741,447 | 4/1956 | Heal | 29/449 |
| 2,803,209 | 8/1957 | McDaniel | 269/43 |
| 2,988,810 | 6/1961 | Wilken | 29/449 |
| 3,973,766 | 8/1976 | Heath | 269/43 |
| 4,624,451 | 11/1986 | Mortoly | 269/71 |
| 4,819,922 | 4/1989 | Boike | 269/45 |
| 4,836,518 | 6/1989 | Janutta | 269/43 |
| 4,894,903 | 1/1990 | Woods | 269/43 |

FOREIGN PATENT DOCUMENTS 1502859  3/1970  Fed. Rep. of Germany ........ 269/43

*Primary Examiner*—Robert C. Watson
*Attorney, Agent, or Firm*—Charles Berman

[57] ABSTRACT

A tool for locating a predetermined number of turbine blades in relative operative position with each other includes a base with a space and sidewalls with a space between them. Blades are located sequentially and adjacently between the sidewalls so that the blades are accurately and snugly located between the sidewalls. The top of the sidewalls has an arc of curvature representative of the arc of curvature for a rotor for accommodating the blades ordinarily. When the blades are located in the space, the curvature of the top of the sidewalls conforms with the curvature of the rotor. The blades can then be adjusted and aligned such that when located in the rotor they will be accurately positioned.

14 Claims, 4 Drawing Sheets

BLADE ASSEMBLY TOOL

BACKGROUND

The precise and accurate location and assembly of blades for turbines is essential. This prevents premature breakdown of the blades and turbines. This invention relates to a tool for verifying the uniformity of blades for turbines and the assembly relationship on a turbine rotor.

The refurbishment of rotor blades for steam turbine owners has an important economic advantage in that the replacement with new blades is avoided. Often refurbished blades can be equal or better than new blades. The time taken for refurbishing can also be less than the time needed to fabricate new blades. Accordingly there is a need for effective blade refurbishment techniques and tools.

One disadvantage in refurbished blades is that blade repair or brazing can cause distortion of reworked parts. Often this distortion is not discovered until the parts are being installed, assembled, or being machine-finished. This difficulty is compounded when reworking is effected in one location and installation is effected in a different location.

To overcome problems of refurbishing, detailed design drawings, gauges such as a guillotine gauge, shutter gauge or box gauge are used to verify the proper blade contours, twist, lean, thickness, in relationship to the radial lines of the disc. Often these different gauges are difficult to obtain or use accurately. Thus engineering and reworking of parts is often difficult if detailed design drawings are not available. When original equipment manufactured parts and non-original equipment manufactured parts are used in combination, problems of tolerance and interchangeability are compounded.

There is accordingly a need to provide for the determination of the blade relationship in assembled condition with regard to neighboring blades and other stationary parts. With such a determination refurbishment and alignment can be more accurately effected.

SUMMARY

By this invention this need is met and means are provided for accurately aligning an assembled condition at remote locations refurbished and new blades. By this means the need for transporting a rotor to the refurbishment sight is avoided.

According to the invention a tool for locating a predetermined number of blades in relative operative adjacent relationship with each other comprises a base and means for locating the blades in operative relationship with respect to the base. In some embodiments there is a spaced sidewall affixed to the base. The spaced sidewalls and base form a space between which the roots of respective blades can be located in snug location adjacent to the sidewalls.

The end portion of the sidewalls removed from the base has an arc of curvature representative or the same as the arc of curvature of the rotor for accommodating the blades. When the blades are located with the root of the blade in the spacing, the blades adopt a location relative to each other which is representative, namely the same, as the blade position in the rotor.

The tool provides for locating about five blades in adjacent relationship. A mating holding fixture associated with each sidewall secures the blades in location between the sidewalls, and a set screw operates with the holding fixtures to lock the blades in position.

The invention is directed to the tool for locating the blades in the assembled relationship. Also part of the invention is a method for assembly of the blades in the assembled relationship in the tool such that alignment of the blades and components of the blades can be accurately effected.

The invention is now further described with reference to the accompanying drawings.

DRAWINGS

DESCRIPTION

Figures 1, 2:
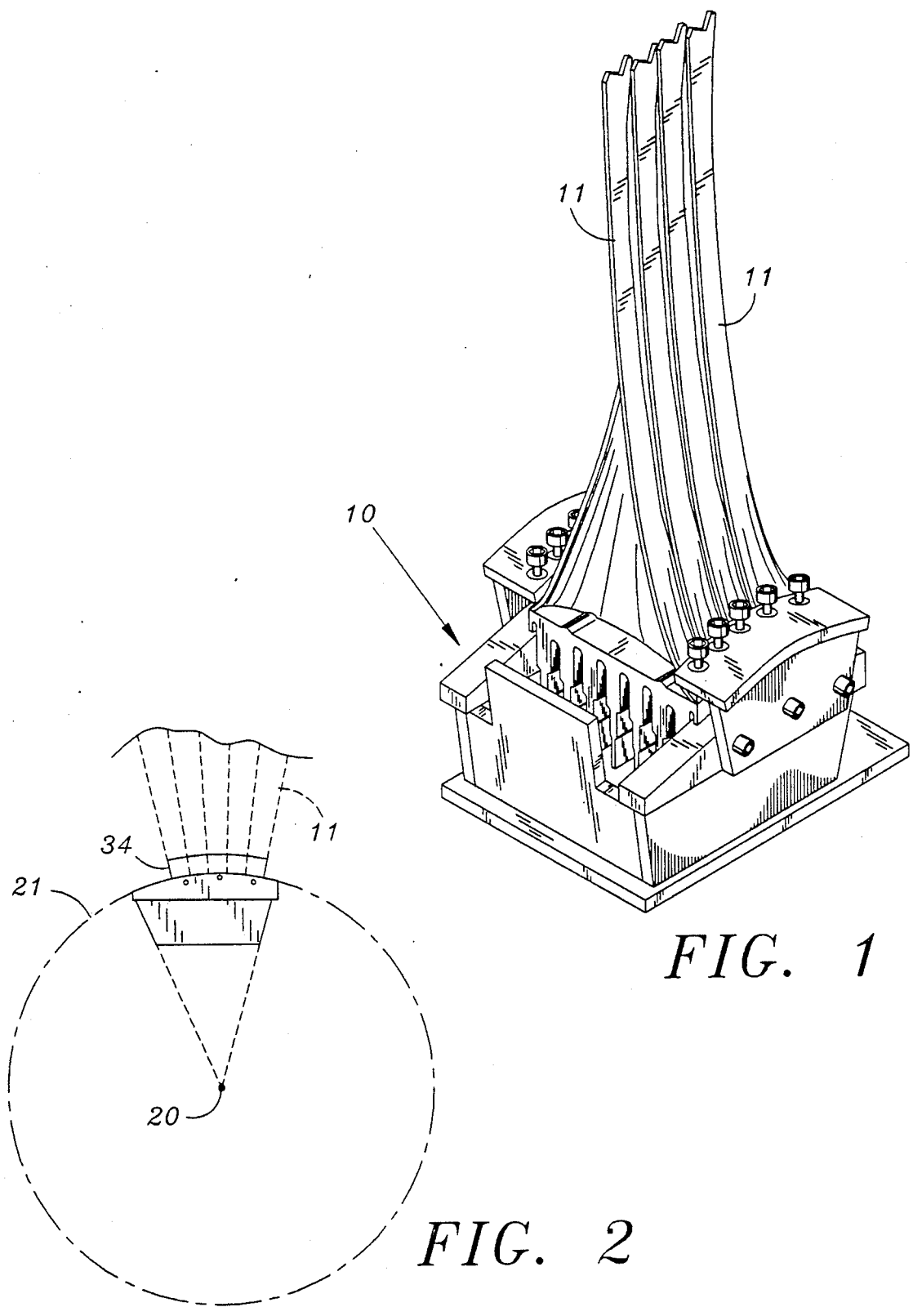
FIG. 1 is a perspective view of the tool shOWing five blades assembled and located in the tool.
FIG. 2 is a diagrammatic view of a rotor showing a representative portion of a tool or rotor section to constitute the tool.
Figure 3:
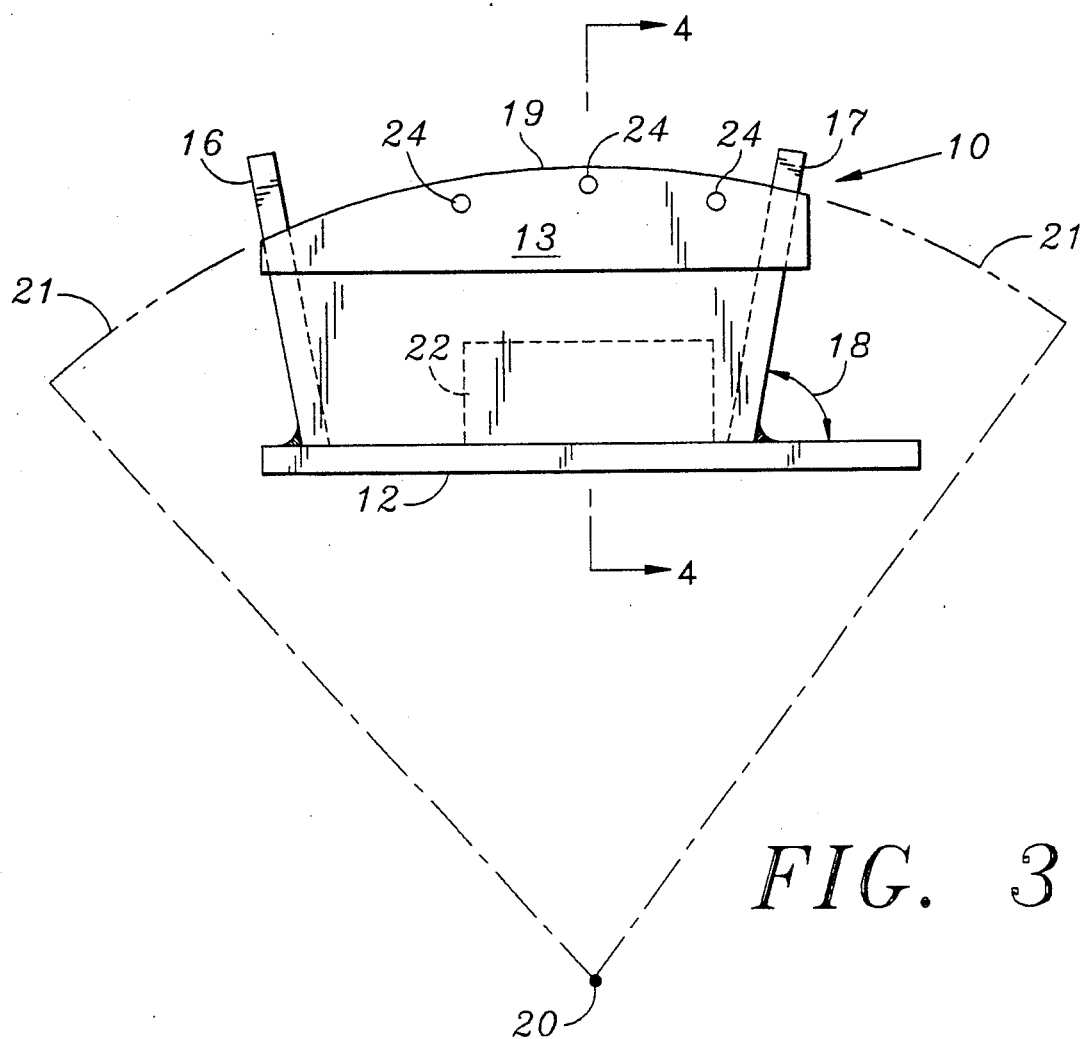
FIG. 3 is a side view of the tool illustrating the base and arced sidewalls.
Figure 4:
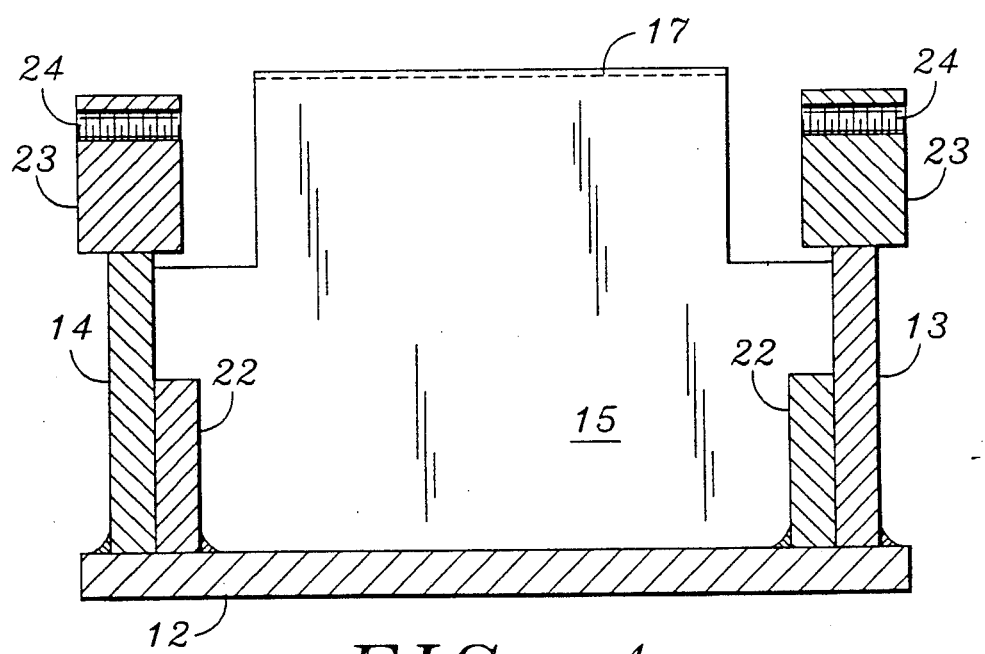
FIG. 4 is a sectional end view of the tool illustrating the base and sidewalls.
Figure 5:
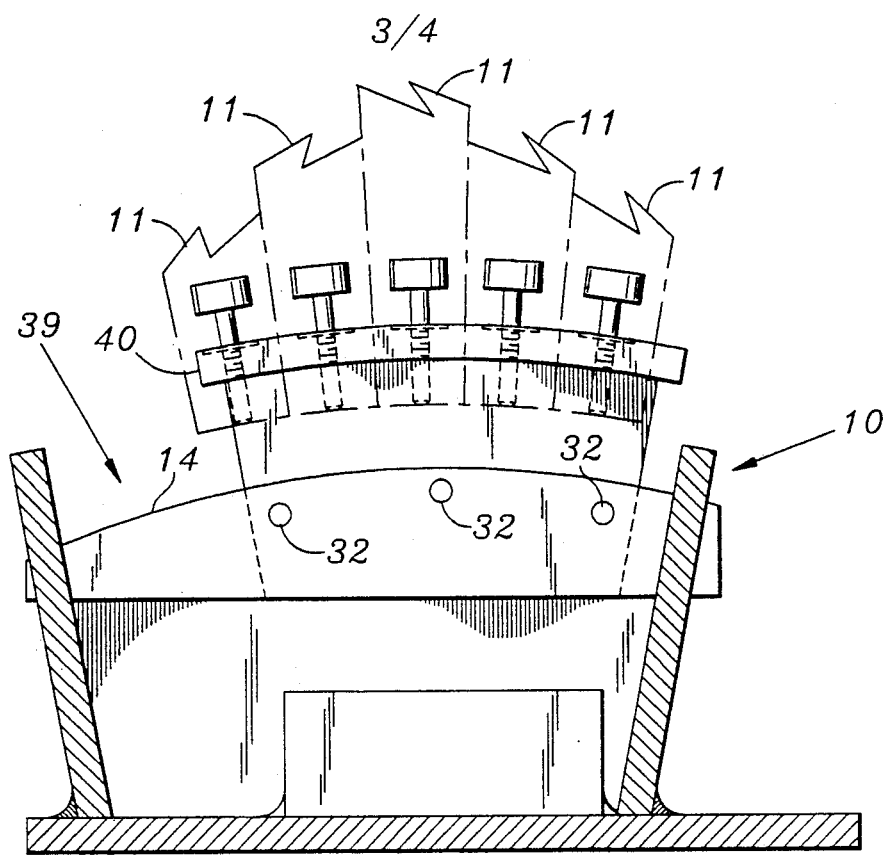
FIG. 5 is a sectional side view illustrating an assembly of the tool with five representative blades diagrammatically illustrated and the holding fixture shown in position.

A tool 10 for locating a predetermined number of adjacent blades 11 includes a base 12 with two spaced sidewalls 13 and 14. The sidewalls 13 and 14 are upstanding from a horizontal base 12 and together form the width of the base to define a space 15 between them. At opposite ends of the sidewalls there are end walls 16 and 17. The walls are non-right angularly located relative to the base 10. As such the walls 16 and 17 are angled outwardly from each other relative to the space 15. The angle 18 is approximately 80 degrees in the embodiment illustrated.

The top edge or portion 19 of the sidewalls 13 and 14 provides an arc of curvature which is centered as diagrammatically illustrated at 20. The arc of curvature of the top edge or portion 19 is representative for the same as the arc of curvature of the top of a rotor. The top of the rotor is diagrammatically illustrated by dashed lines 21 to either side of the top 19. As will be seen the rotor is very much larger than the segment constituted by the tool 10 and indicated by top edge 19. The rotor however will have the same radius of curvature as the tool. The tool is constituted by the base 12 and sidewalls 13 and 14 and end walls 16 and 17 which would essentially constitute a segment about 18 inches in base length and about 8 inches in overall height. Accordingly the tool 10 is essentially a small segment of the rotor.

Each of the sidewalls 13 and 14 is constituted effectively by a pedestal-type structure with a reinforcing short walls 22 welded to the sidewalls 13 and 14 respectively. This provides sufficient steadiness to the sidewalls 13 and 14. At the top 19 of each of the sidewalls 13 and 14 is a thickened rail 23. Horizontally directed threaded apertures 24 are directed through the rail 23.

Two mating holding fixtures are respectively provided, one for each of the sidewalls 13 and 14. The mating holding fixtures include a mating sidewall 26 and a top plate 27. The top plate 27 is spaced from the top 28 of the rail 23. The top of sidewall 26 provides a curvature corresponding to the curvature of top edge 19. A vertical aperture 29 is threaded to receive a set screw 30. A different holding screw 31 passes through the aperture 24 and a similar aperture 32 in the sidewall 26 of the holding fixture 25. In the illustrated tool 10 there are three spaced apertures 32 in the sidewall 26 and correspondingly three spaced apertures 24 in the sidewalls 13 and 14.

Figure 6:
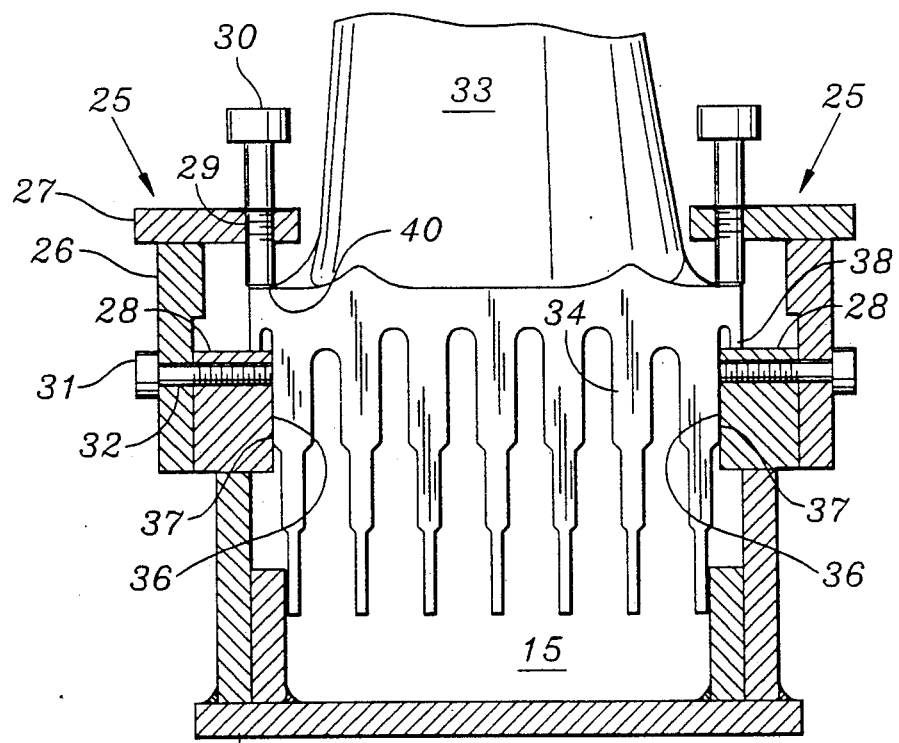
FIG. 6 is a sectional end view illustrating the tool with a blade in position such that the blade root is located in the space between the base and sidewalls.

In operation of the tool 10 blades 11 are located in the space 15 defined between the base 12 and sidewalls 13 and 14. The blade 12 has a foil section 33 and a root section 34. As illustrated in FIG. 6 there are seven fingers 35 to the root 34. As indicated the outer extremity or periphery 36 of the root 34 engages the inside face 37 of the rails 23 which form part of the sidewalls 13 and 14. In this manner the sides of root 34 located adjacent to and between the sidewalls 13 and 14 in a snug transverse location.

To ensure that the root 34 does not extend more than desired into the space 15 the top 28 of the rail 23 abuts with peripheral teeth 38 which extend to either side of the root 34. In this manner each blade 12 is positively located in position in the space 15. Blades 12 are sequentially located in the space 15 with the first blade adjacent to the end wall 10 and subsequent blades 11 inserted circumferentially. The blades 11 are inserted through the space 39 adjacent the end wall 16. The space or gap 39 is defined between the end wall 16 and the end 40 of the holding fixture 25.

When the blades 12 are in position the set screws 30 are tightened down so that the leading ends 40 of the set screws abut the root 34 above the teeth 38. This facilitates secure anchorage of the root in the space. With the blades 11 so positioned, alignment of each of the blades 12 can be determined and adjusted. Refurbishing of the blades and alignment and adjustment can be effected with the aid of different gauges.

The tool is a jig which is illustrated to hold five blades as precisely as a rotor 21 would hold the blades 12. The same axial, tangential and radial constraints as the rotor itself is applied to the blades 12 through the tool. The tool 10 is fabricated to comply or match with a top 19 a radius of curvature of each respective rotor for which blades 12 operate. Adjacent blades can be properly aligned with this technique. Refurbished blades 11 or original equipment manufactured blades 11 can be randomly located in position in the tool 10.

The tool 10 can be constituted by a scrapped disc or rotor portion. The set screws 30 facilitate attachment of the finger roots 34 and the radial entry design of the roots 34 into the rotors. In other configurations where there is an axial entry of the root 34 into the rotor a curved skewed or straight slot can be mold on a segment of curved plate with a single set of seating surfaces such as the top set of hooks in a serrated design or the bottom set of hooks in a circumferential groove design. This ensures proper alignment in the radial, axial and tangential planes.

The tool 10 permits for the visual indication and compatibility determination of adjacent blades 11 such that interference or excessive clearance problems can be rectified at sights remote from the rotor location. In this manner compatible blades 11 can be refurbished and provided as new and assembled remotely. There is the assurance that on assembly at the location of the rotor 21 the blades 11 be operative when assembled. With the tool 10, complex refurbishings such as restoration of tie wire holes and lashing lugs, use of Stellite (Trademark) bar noses as a repair or enhancement, and an attachment of brazed Stellite (Trademark) shields can be provided.

Figure 7:
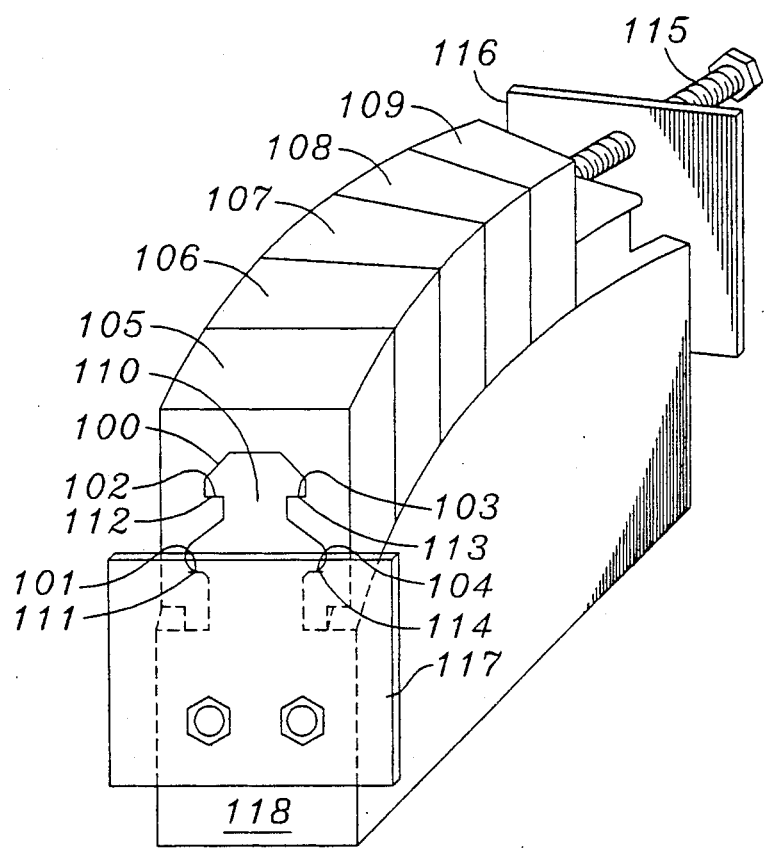
FIG. 7 is a perspective diagramatic view illustrating an embodiment of the tool for use with circumferential grooves.

In FIG. 7 a tool is illustrated for locating circumferential grooves. A groove 100 has four support positions 101, 102, 103 and 104. The groove 100 in the root portions 105, 106 107, 108 and 109 are located on a mating upstanding post affixing means, being a post 110. The post has a similar profile and support positions 111, 112, 113 and 114, to the groove support positions 101, 102, 103 and 104. In this embodiment there are no side walls necessary since the post and grooves form the means for snug anchorage. A set screw 115 is mounted on end plate 116 and is fastened up to clamp the root portions 105, 106, 107 108 and 109 in snug relationship. There is an opposite end plate 117 onto which the base 118 having the post 110 is mounted. The base 118 and affixing means have the appropriate curvature representative of an arc of a rotor.

Many other forms of the invention exist each differing from others in matters of detail only. The scope of the invention is to be determined solely by the appended claims.

We claim:

1. A pre-assembly verification tool for temporarily locating a predetermined number of blades of a rotor in relative operative adjacent relationship with each other comprising a support, spaced sidewalls affixed to the support, the support and sidewalls forming a space for locating roots of respective blades in adjacent abutting relationship, the spaced sidewalls being separated to accommodate the thickness of the roots so that the roots may be located snugly between the sidewalls, a portion of the sidewalls having an arc of curvature representative of an arc of curvature for a rotor for temporarily accommodating the blades such that when the blades are temporarily located with the roots in the space, the blades adopt a temporary location relative to each other representative of a permanent blade position in the rotor, and wherein the arc of curvature forms a regular smooth uninterrupted curved surface, and including a holding fixture for securing the roots in the space, the holding fixture being for removable attachment to a sidewall, set screws interacting with the holding fixture and the sidewalls through threaded apertures provided in the holding fixture and the sidewalls, the holding fixture having a sidewall for parallel location with the sidewall adjacent to the support, and wherein with the holding fixture in operative position relative to the sidewall, a portion of the blade is sandwiched between the smooth curved surface and the holding fixture, and wherein the holding fixture is operative wholly outside a plane of the arc of curvature of the surface of the sidewall.

2. A tool as claimed in claim 1 wherein the top of the sidewalls provide the regular smooth uninterrupted surface for engaging a tooth of the blade adjacent to the root thereby to facilitate accurate accommodation of the root in the space.

3. A tool as claimed in claim 1 wherein the space is sufficiently large to accommodate two adjacent roots.

4. A tool as claimed in claim 1 wherein the space is sufficiently large to accommodate at least five adjacent roots.

5. A tool as claimed in claim 1 wherein the top of the sidewall of the holding fixture is curved similarly to the top of the sidewall.

6. A tool as claimed in claim 5 including a top plate affixed to the holding fixture sidewall, spaced threaded apertures for receiving set screws, the leading end of the set screws in the top plate interacting with the roots in the space.

7. A tool as claimed in claim 1 including a mating holding fixture for each sidewall.

8. A tool as claimed in claim 1 including spaced end walls between the spaced sidewalls.

9. A tool as claimed in claim 1 wherein the arc of curvature of the sidewalls is the same as the arc of curvature of the rotor.

10. A pre-assembly verification tool for temporarily locating a predetermined number of blades of a rotor in relative operative adjacent relationship with each other thereby to permit blade refurbishment comprising a support, affixing means relative to the support for locating roots of respective blades in adjacent relationship, the affixing means accommodating the blades so that the roots may be located in snug abutting relationship, the support and affixing means having an arc of curvature representative of an arc of curvature for a rotor for temporarily accommodating the blades such that, when the roots are temporarily located with the affixing means, the blades adopt a temporary location relative to each other representative of a permanent blade position in the rotor, an wherein the arc of curvature forms a regular smooth uninterrupted curved surface, and wherein the affixing means is a post, the post being adapted to engage a groove of the root.

11. Apparatus as claimed in claim 10 wherein the groove and post have matching profiles.

12. A tool as claimed in claim 1 wherein after use in the tool, the blades are relatively individually removable from the tool.

13. A tool as claimed in claim 1 wherein the support is a base affixed to the sidewalls.

14. A tool as claimed in claim 1 wherein the support is an end wall affixed to the sidewalls.

* * * * *